(12) United States Patent
Higuchi (10) Patent No.: US 8,244,929 B2
(45) Date of Patent: *Aug. 14, 2012

(54) DATA PROCESSING APPARATUS

(75) Inventor: Ryohei Higuchi, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/328,573

(22) Filed: Dec. 16, 2011

(65) Prior Publication Data

US 2012/0089771 A1    Apr. 12, 2012

Related U.S. Application Data

(63) Continuation of application No. 12/705,104, filed on Feb. 12, 2010, now Pat. No. 8,099,530.

(30) Foreign Application Priority Data

Feb. 13, 2009    (JP) ................... 2009-031360

(51) Int. Cl.
*G06F 3/00*    (2006.01)
*G06F 13/00*    (2006.01)
(52) U.S. Cl. .......................... 710/20; 711/148
(58) Field of Classification Search .......... 710/20; 711/148

See application file for complete search history.

(56) References Cited

U.S. PATENT DOCUMENTS

| | | | |
|---|---|---|---|
| 6,145,026 A | 11/2000 | Ziegler | |
| 6,237,108 B1 | 5/2001 | Ogawa et al. | |
| 6,678,801 B1 * | 1/2004 | Greim et al. | 711/148 |
| 2003/0093445 A1 * | 5/2003 | Schick et al. | 707/205 |
| 2004/0034858 A1 * | 2/2004 | Kushlis | 718/108 |
| 2007/0174411 A1 | 7/2007 | Brokenshire et al. | |
| 2008/0005522 A1 | 1/2008 | Paladini et al. | |
| 2008/0162835 A1 | 7/2008 | Wilson et al. | |
| 2008/0301336 A1 | 12/2008 | Bilak et al. | |
| 2009/0083496 A1 | 3/2009 | Stevens, Jr. | |

FOREIGN PATENT DOCUMENTS

JP    2006-072832    3/2006

* cited by examiner

*Primary Examiner* — Henry Tsai
*Assistant Examiner* — Hyun Nam
(74) *Attorney, Agent, or Firm* — Womble Carlyle (57) ABSTRACT

A data processing apparatus reduces the number of the buffer SRAMs to decrease chip area. The data processing apparatus includes an SDRAM address allocation register that holds information indicating which region of the SDRAM will be allocated to each of the IPs, and a buffer SRAM address allocation register that holds information indicating which region of the first and second buffer SRAMs will be allocated to each of the IPs. The bus I/F stores the data read from the SDRAM into the second buffer SRAM with reference to the SDRAM address allocation register and the buffer SRAM address allocation register. Therefore, it is not necessary to provide each of the IPs with a buffer SRAM, which allows integration into a small number of buffer SRAMs.

19 Claims, 11 Drawing Sheets

DATA PROCESSING APPARATUS

CROSS-REFERENCE TO RELATED APPLICATIONS

This is a continuation of U.S. patent application Ser. No. 12/705,104, filed 12 Feb. 2010, Now U.S. Pat. No. 8,099,530, which claims priority to Japanese Patent Application No. 2009-31360 filed on Feb. 13, 2009. The contents of the aforementioned applications, including their specifications, drawings and abstracts are incorporated herein by reference in their entirety.

BACKGROUND OF THE INVENTION

The present invention relates to technology of controlling access to a memory from a plurality of modules that perform image processing, communication processing, or the like and particularly to a data processing apparatus that controls access to the memory so that buffer memories can be reduced.

In recent years, more advanced and multiple functionalities of CPU (Central Processing Unit)-equipped systems have been progressing. As one of such systems, a system that supports multimedia can be included.

Under the memory architecture of multimedia system LSI (Large Scale Integrated circuit), it has become impossible to store image data equivalent to one frame in an on-chip memory due to reasons such as enlarged screen sizes supported thereby. Accordingly, it has become common to store image data including intermediate data required for image processing in a large capacity memory such as an DRAM (Dynamic Random Access Memory). As a related technology, there is an invention disclosed in Japanese Patent Laid-Open No. 2006-072832.

Japanese Patent Laid-Open No. 2006-072832 aims to provide an image processing system that can increase the processing speed. The image processing system includes a DRAM that temporarily stores image data; a DRAM control unit that performs read/write control of the DRAM; a plurality of image processing units that perform predefined image processes on the image data; an image input unit; an image output unit; and a cache system provided between the DRAM control unit and the image processing units to transfer the image data. The cache system performs, on the DRAM, a read-ahead operation by prefetching the read address and a write-back operation that collectively writes data later. The image data input from and output to the image processing units, the image input unit, and the image output unit is read from and written into the DRAM by DMA via a read cache or write cache.

When an SDRAM (Synchronous DRAM) is used as the memory of the multimedia system LSI, for example, accesses will concentrate on the SDRAM. Therefore, an improvement in memory access efficiency to the SDRAM becomes the key point in SoC (System on Chip) design. An SDRAM is known as a memory device having a poor random access performance, for which the realization of a long burst access is important to improve the access efficiency.

In addition, a multimedia system LSI has modules for image processing or communication processing mounted thereon, with a buffer SRAM (Static Random Access Memory) being installed in each of these IPs for temporarily storing the data written into and read from the SDRAM.

However, provided that a buffer SRAM to each of the IPs requires a large number of SRAMs, the chip area of the LSI becomes larger. In addition, the circuit size becomes larger if each of the IPs is provided with a bus I/F (Interface). Additionally, if a buffer SRAM is provided to each of the IPs, there arises a problem that it becomes difficult to flexibly adjust the buffer capacity. However, Japanese Patent Laid-Open No. 2006-072832 cannot solve the problems described above.

SUMMARY OF THE INVENTION

The present invention, which was conceived to solve the problems described above, provides a data processing apparatus that can reduce the number of buffer SRAMs for the reduction of the chip area.

According to an embodiment of the invention, a data processing apparatus that controls data transfer between a plurality of IPs and an SDRAM is provided. The data processing apparatus includes a bus I/F that controls data reading from the SDRAM; a buffer SRAM that stores the data read by the bus I/F; IP I/Fs provided corresponding to the IPs to control data output to the IPs; an SDRAM address allocation register that holds information indicating which region of the SDRAM will be allocated to each of the IPs; and a buffer SRAM address allocation register that holds information indicating which region of the buffer SRAM will be allocated to each of the IPs.

The bus I/F determines, with reference to the SDRAM address allocation register, from which region of the SDRAM data will be read, and determines, with reference to the buffer SRAM address allocation register, into which buffer SRAM the data read from the SDRAM will be stored.

The IP I/F determines, with reference to the buffer SRAM address allocation register, in which region of the buffer SRAM the data will be stored, reads the data and outputs it to one of the IPs.

According to the embodiment, since the bus I/F determines, with reference to the SDRAM address allocation register, from which region of the SDRAM data will be read and determines, with reference to the buffer SRAM address allocation register, in which buffer SRAM the data read from the SDRAM will be stored, it is not necessary to provide a buffer SRAM to each of the IPs, which allows integration into a small number of buffer SRAMs.

DETAILED DESCRIPTION OF THE PREFERRED EMBODIMENTS

Figure 1:
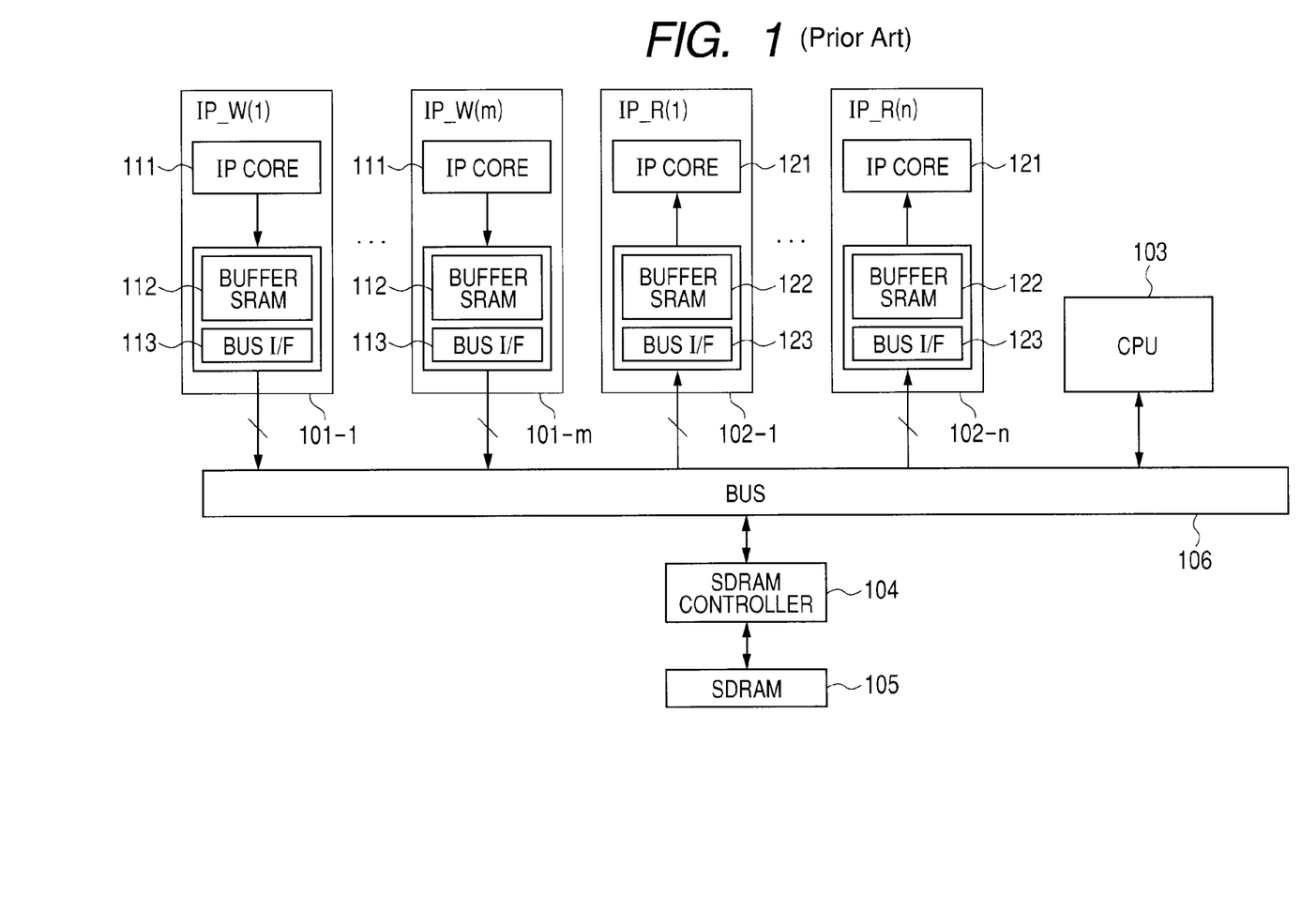
FIG. 1 shows a general exemplary configuration of a multimedia system LSI.

FIG. 1 shows a general exemplary configuration of a prior art multimedia system LSI. The multimedia system LSI includes IPs W (1) to (m) (101-1 to 101-m) and IPs R (1) to R (n) (102-1 to 102-n) that perform image processing, communication processing, or the like; a CPU (Central Processing Unit) 103; an SDRAM controller 104; and an SDRAM 105. The IPs W (1) to (m) (101-1 to 101-m), The IPs R (1) to (n) (102-1 to 102-n), the CPU 103, and the SDRAM controller 104 are connected via a bus 106.

The CPU 103 controls the IPs W (1) to (m) (101-1 to 101-m), the IPs R (1) to (n) (102-1 to 102-n), and the SDRAM controller 104, and also performs operations by itself.

The IPs W (1) to (m) (101-1 to 101-m), provided with a function of storing the processed data in the SDRAM, include respectively an IP core 111, a buffer SRAM 112, and a bus I/F (Interface) 113. The IP core 111 is a module that performs image processing, communication processing, or the like. When writing the data generated by image processing into the SDRAM 105, the IP core 111 temporarily stores the data in the buffer SRAM 112. The buffer SRAM 112 outputs the stored data to the bus 106 via the bus I/F 113. The IP core 111 then writes the data, which has been output to the bus 106, into the SDRAM 105 via the SDRAM controller 104.

The IPs R (1) to (n) (102-1 to 102-n), provided with a function of reading data to be processed from the SDRAM 105, include, respectively, an IP core 121, a buffer SRAM 122, and a bus I/F 123. When reading the data to be used for image processing or the like from the SDRAM 105, the IP core 121 outputs the data read from the SDRAM 105 via the SDRAM controller 104 to the bus 106. The data output to the bus 106 is temporarily stored in the buffer SRAM 122 via the bus I/F 123. The IP core 121 then reads the data stored in the buffer SRAM 122.

As thus described, the IP core 111 temporarily stores the data to be written into the SDRAM 105 in the buffer SRAM 112, and the IP core 121 temporarily stores the data read from the SDRAM 105 in the buffer SRAM 122 in order to realize a long burst access so that access efficiency of the SDRAM 105 is increased. In the multimedia system LSI shown in FIG. 1, the number of buffer SRAMs increases and the chip area becomes larger, because each of the IPs is provided with a buffer SRAM. In addition, the circuit size becomes larger because each of the IPs is provided with a bus I/F.

In addition, the capacity of the buffer cannot be flexibly adjusted because each of the IPs is provided with a dedicated buffer SRAM of predetermined size. For example, when a 512-byte SRAM is insufficient in capacity, a 1024-byte SRAM has to be used, which may result in a large amount of wasted capacity if the shortage in capacity is small.

In addition, because each of the IPs is provided with a buffer SRAM, even when an IP is not operating, a buffer SRAM included in the IP occupies a space in the chip, which results in an increased chip area of the LSI.

In addition, because each of the IPs is provided with a bus I/F, a number of bus wirings are drawn on the LSI chip. This is because a bus usually includes many signal lines such as address signals, data signals, control signals, or the like. Accordingly, timing closure becomes difficult as the wiring area grows.

Furthermore, the modification of the bus specification requires the modification of the bus I/F part of all the IPs, which increases the work load. In order to solve such problems, a configuration of a semiconductor integrated circuit will be described below.

Figure 2:
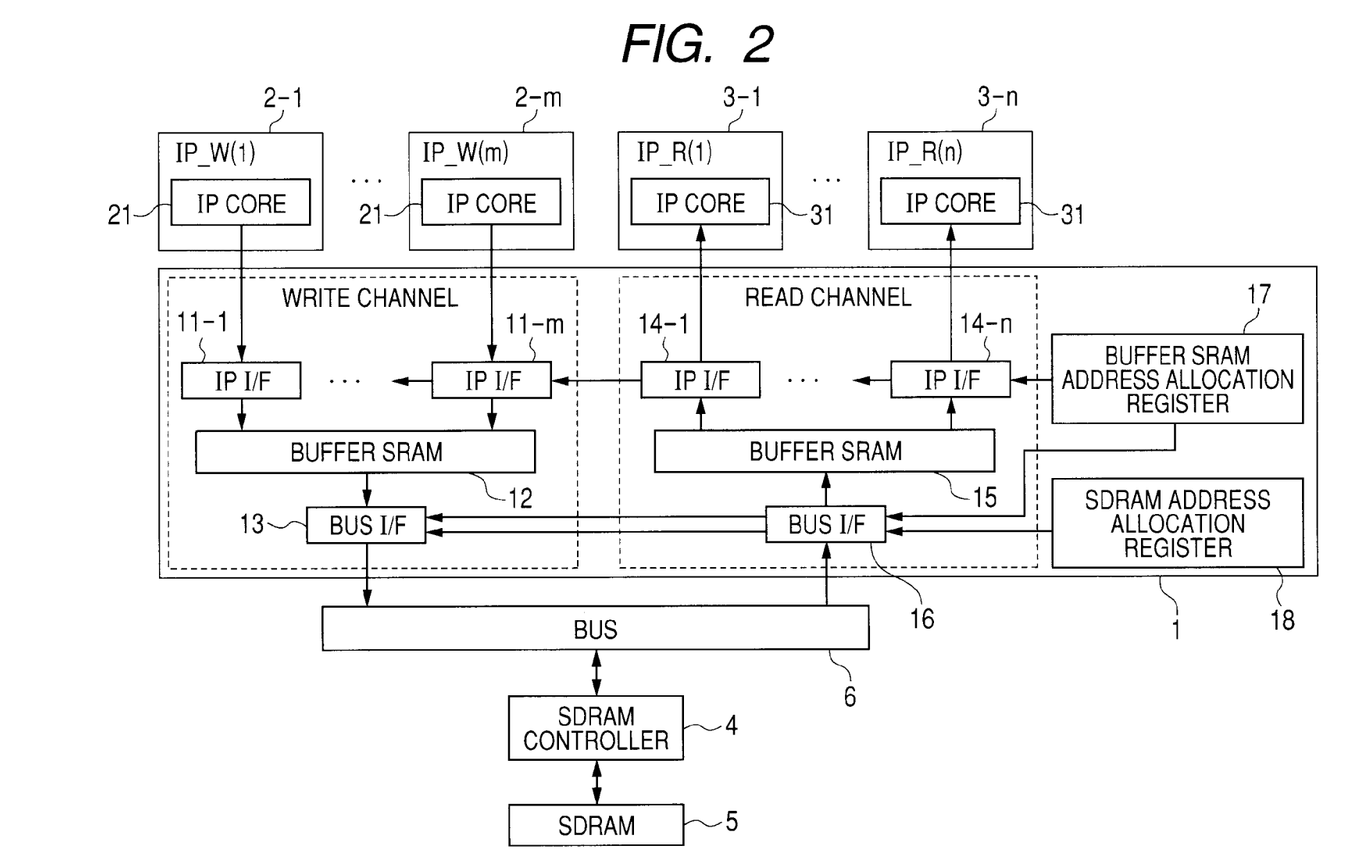
FIG. 2 shows an exemplary configuration of semiconductor integrated circuit including the data processing apparatus according to a first embodiment of the invention.

FIG. 2 shows an exemplary configuration of a semiconductor integrated circuit including the data processing apparatus according to the first embodiment of the invention. The semiconductor integrated circuit includes a data server (data processing apparatus) 1, the IPs W (1) to (m) (2-1 to 2-m) and IPs R (1) to R (n) (3-1 to 3-n) that perform image processing, communication processing, or the like, an SDRAM controller 4, and an SDRAM 5. Furthermore, although not illustrated, a CPU performs control of the IPs W (1) to (m) (2-1 to 2-m), the IPs R (1) to (n) (3-1 to 3-n), and the SDRAM controller 4, in the same way as the multimedia system LSI shown in FIG. 1. In addition, the IPs W (1) to (m) (2-1 to 2-m) and the IPs R (1) to R (n) (3-1 to 3-n) are also simply referred to as modules.

The data server 1 includes a write channel to which the IPs W (1) to (m) (2-1 to 2-m) are connected, and a read channel to which the IPs R (1) to (n) (3-1 to 3-n) are connected.

The write channel includes IP I/F 11-1 to 11-m that are provided respectively corresponding to the IPs W (1) to (m) (2-1 to 2-m), a buffer SRAM 12, and a bus I/F 13. The read channel includes IP I/F 14-1 to 14-n that are provided respectively corresponding to the IPs R (1) to (n) (3-1 to 3-n), a buffer SRAM 15, and a bus I/F 16. Furthermore, the buffer SRAMs 12 and 15 include a dual port SRAM that can read and write data simultaneously.

The data server 1 further includes a buffer SRAM address allocation register 17 that stores information indicating which region of the buffer SRAM 12 will be allocated to the IPs W (1) to (m) (2-1 to 2-m), and which region of the buffer SRAM 15 will be allocated to the IPs R (1) to (n) (3-1 to 3-n), and an SDRAM address allocation register 18 that stores information indicating into which region of the SDRAM 5 data will be written from the IPs W (1) to (m) (2-1 to 2-m), and from which region of the SDRAM 5 data will be read by the IPs R (1) to (n) (3-1 to 3-n).

Figure 3:
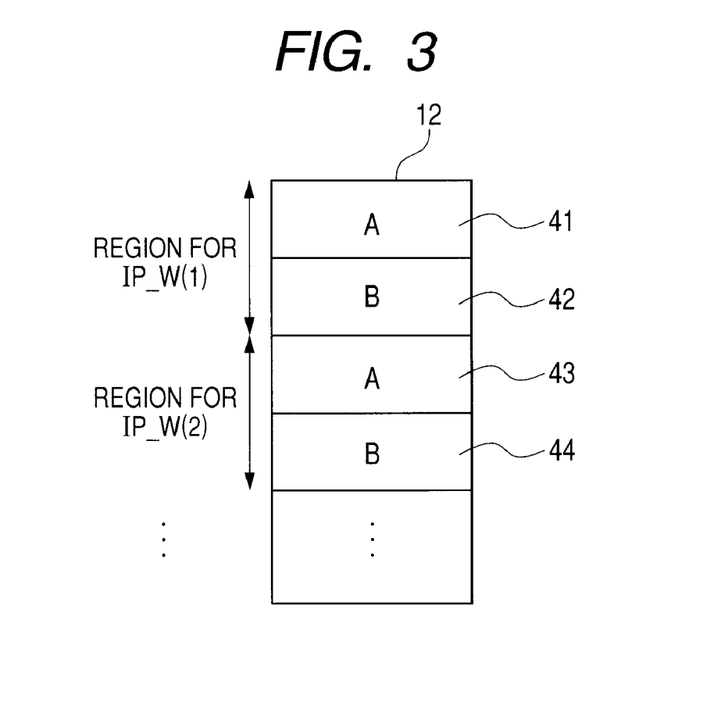
FIG. 3 is an explanatory drawing showing a region division in a buffer SRAM 12 of a write channel.

FIG. 3 is an explanatory drawing showing a region division in the buffer SRAM 12 of the write channel. As shown in FIG. 3, a region 41 of the buffer SRAM 12 is allocated as a region A for the IP W (1), a region 42 is allocated as a region B for the IP W (1), region 43 is allocated as a region A for the IP W (2), and a region 44 is allocated as a region B for the IP W (2). Regions for the IPs W (3) to W (m) are allocated in the same way.

If, for example, the IP W (1) is an image processing IP, a capacity capable of storing image data equivalent to one line, for example a 4K-byte region, is provided in the buffer SRAM 12 as a region for the IP W (1).

The buffer SRAM address allocation register 17 holds the starting address of the region A for the IP W (1), the starting address of the region B for the IP W (1), the starting address of the region A for the IP W (2), and the starting address of the region B for the IP W (2). The starting address of each of the regions is held in the buffer SRAM address allocation register 17 in the same way as for the IPs W (3) to W (m). Furthermore, by calculating the starting address of the region B from the starting address and the capacity of the region A, the starting address of the region B need not be held in the buffer SRAM address allocation register 17.

Figure 4:
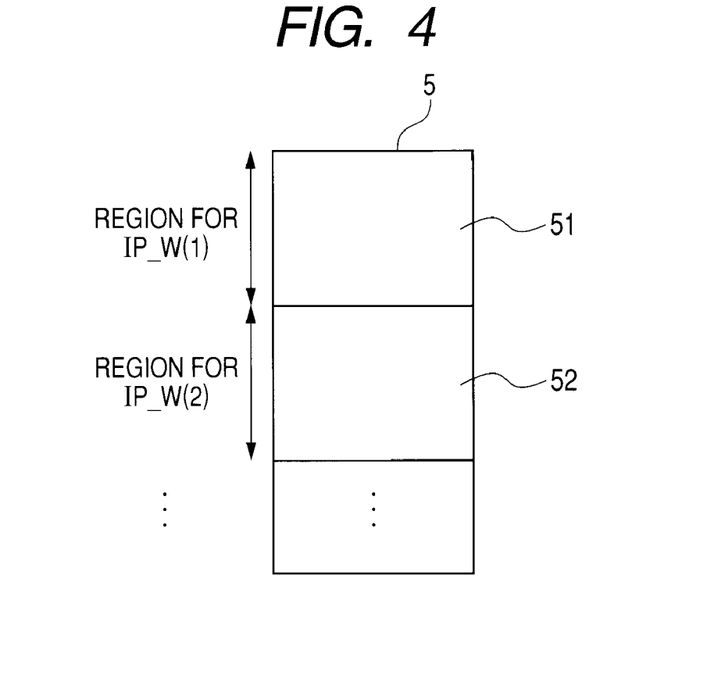
FIG. 4 is an explanatory drawing showing a region division in an SDRAM 5.

FIG. 4 is an explanatory drawing showing a region division in the SDRAM 5. As shown in FIG. 4, a region 51 of the SDRAM 5 is allocated as a region for the IP W (1), and a region 52 is allocated as a region for the IP W (2). Regions for the IPs W (3) to W (m) are allocated in the same way. Although not illustrated, regions for the IPs R (1) to R (n) are separately allocated in the SDRAM 5. The regions for the IPs R (1) to R (n) may be allocated in an overlapping manner with the regions for the IPs W (1) to W (m), or different regions that do not overlap with the regions for IPs W (1) to W (m) may be allocated.

If, for example, the IP W (1) is an image processing IP, a capacity capable of storing image data equivalent to one screen, for example a 4M-byte region, is provided in the SDRAM 5 as a region for the IP W (1).

The SDRAM address allocation register 18 holds the starting address of the region for the IP W (1) and the starting address of the region for the IP W (2). The starting address of each of the regions is held in the SDRAM address allocation register 18 in the same way as for the IPs W (3) to W (m) and the IPs R (1) to R (n).

Figure 5:
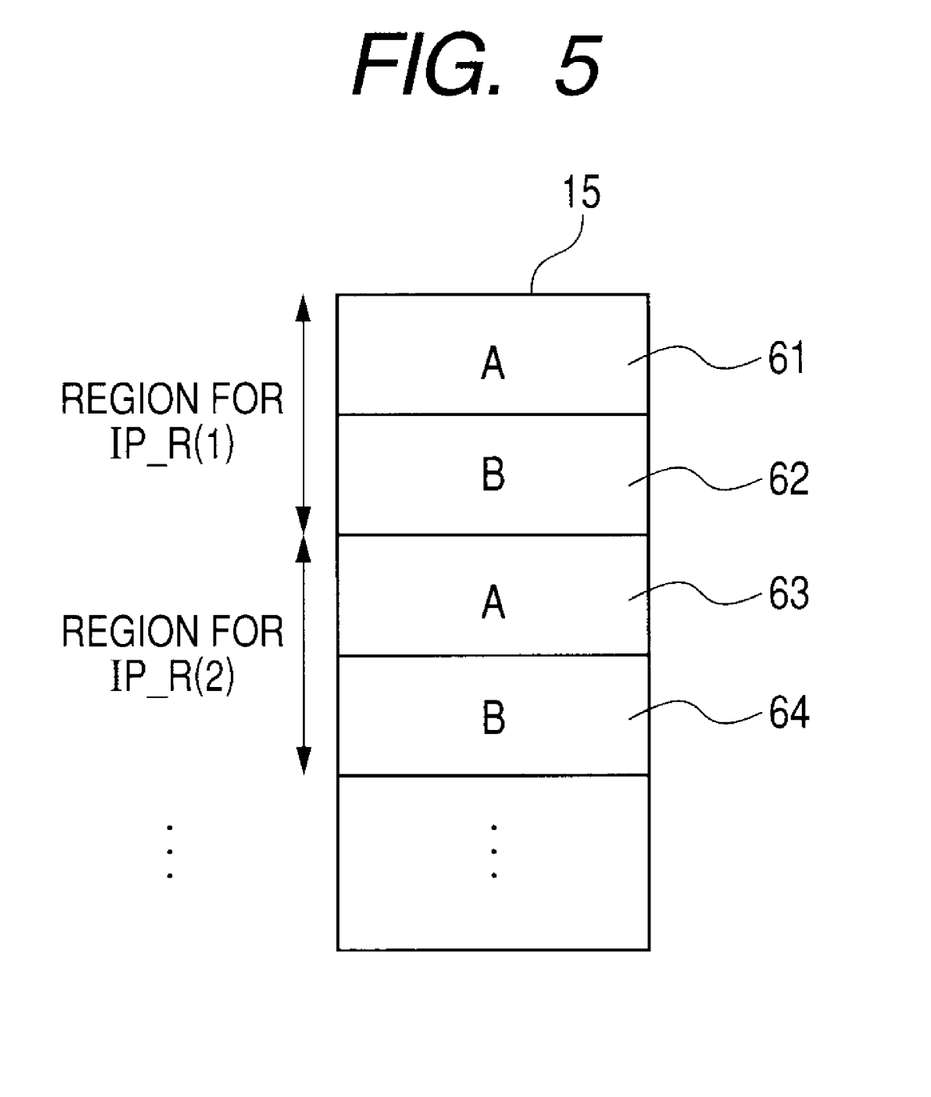
FIG. 5 is an explanatory drawing showing a region division in a buffer SRAM 15 of a read channel.

FIG. 5 is an explanatory drawing showing a region division in the buffer SRAM 15 of the read channel. As shown in FIG. 5, a region 61 of the buffer SRAM 15 is allocated as a region A for the IP R (1), a region 62 is allocated as a region B for the IP R (1), a region 63 is allocated as a region A for the IP R (2), and a region 64 is allocated as a region B for the IP R (2). Regions for the IPs R (3) to R (m) are allocated in the same way.

If, for example, the IP R (1) is an image processing IP, a capacity capable of storing image data equivalent to one line, for example a 4K-byte region, is provided in the buffer SRAM 15 as a region for the IP R (1).

The buffer SRAM address allocation register 17 holds the starting address of the region A for the IP R (1), the starting address of the region B for the IP R (1), the starting address of the region A for the IP R (2), and the starting address of the region B for the IP R (2). The starting address of each of the regions is held in the buffer SRAM address allocation register 17 in the same way as for the IP R (3) to R (m).

Furthermore, by calculating the starting address of the region B from the starting address and the capacity of the region A, the starting address of the region B need not be held in the buffer SRAM address allocation register 17.

Figure 6A:
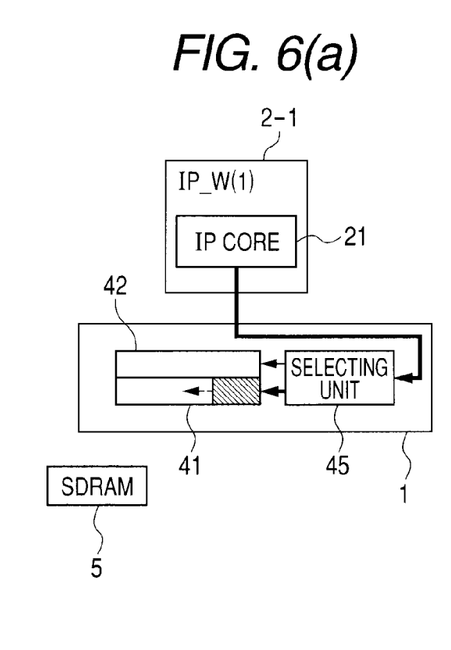
FIG. 6 is an explanatory drawing showing the operation of a data server 1 when IP W (1) 2-1 writes data in the SDRAM 5.
Figure 6B:
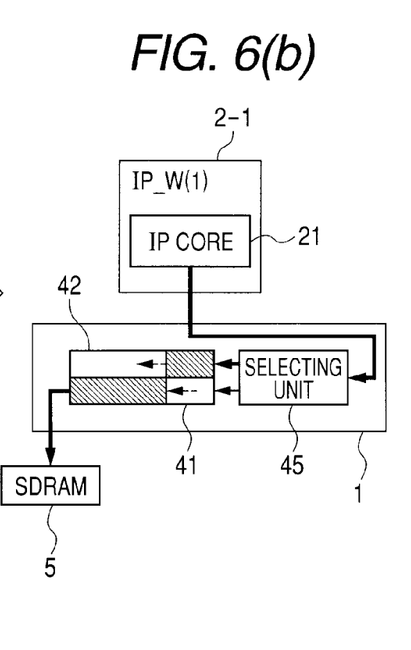
Figure 6C:
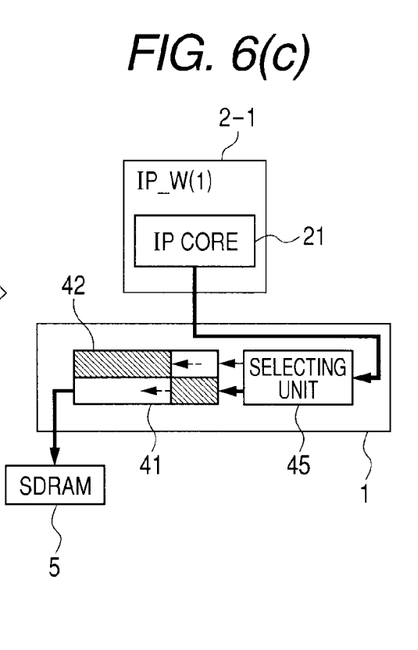

FIG. 6 is an explanatory drawing showing an operation of the data server 1 when the IP W (1) 2-1 writes data into the SDRAM 5. FIG. 6(*a*) shows the IP W (1) 2-1 writing data into the region A 41 (referred to as side A, hereinafter) for the IP W (1) of the buffer SRAM 12.

When an IP core 21 in the IP W (1) 2-1 transfers the first data to the buffer SRAM 12, the IP I/F 11-1 acquires the starting address of side A 41 with reference to the buffer SRAM address allocation register 17. The IP I/F 11-1 then writes data into the first region of side A 41, by outputting the starting address of side A 41 and the data to the buffer SRAM 12. The IP I/F 11-1 then sequentially writes the data transferred from the IP core 21 on side A 41 of the buffer SRAM 12, while incrementing the address of the buffer SRAM 12. Furthermore, a selecting unit 45 is a circuit schematically shown for selecting which of side A 41 or a region B 42 for the IP W (1) (referred to as side B, hereinafter) the data is written into.

FIG. 6(*b*) shows the IP W(1) 2-1 writing data on side B 42 of the buffer SRAM 12. When the IP I/F 11-1 finishes writing data on side A 41, the bus I/F 13 acquires the starting address of the region 51 for the IP W(1) of the SDRAM 5 with reference to the SDRAM address allocation register 18. The bus I/F 13 then outputs the data of the first region to be stored on side A 41 to the SDRAM controller 4 with reference to the buffer SRAM address allocation register 17, and causes the data to be written into the SDRAM 5 by outputting the address of the SDRAM 5. The bus I/F 13 causes the data to be written into the SDRAM 5 by sequentially outputting, to the SDRAM controller 4 via the bus 6, the data stored on side A 41 while incrementing the address of the buffer SRAM 12. In this case, writing of the data into the SDRAM 5 is performed by burst access.

In parallel with the above operation, the IP I/F 11-1 acquires the starting address of side B 42 with reference to the buffer SRAM address allocation register 17. The IP I/F 11-1 then writes data into the first region of side B 42 by outputting the data to the buffer SRAM 12. The IP I/F 11-1 sequentially writes the data transferred from the IP core 21 on side B 42 of the buffer SRAM 12 while incrementing the address of the buffer SRAM 12.

FIG. 6(*c*) shows the IP W (1) 2-1 writing data on side A 41 of the buffer SRAM 12 again. The IP W (1) 2-1, performing the same operation as that described in FIG. 6(*a*), sequentially writes the data transferred from the IP core 21 on side A 41 of the buffer SRAM 12.

In parallel with the above operation, the bus I/F 13 causes the data to be written into the SDRAM 5 by sequentially outputting, to the SDRAM controller 4 via the bus 6, the data stored on side B 42 while incrementing an address of the buffer SRAM 12.

The regions 41 and 42 of the buffer SRAM 12 allocated to the IP W(1) 2-1 operate as a two-sided buffer in a manner like side A→side B→side A→side B→ . . . , and thus sequential burst access to the SDRAM 5 becomes possible.

By repeating the operation described above in FIGS. 6(*a*) to 6(*c*), data is sequentially written into the region 51 for the IP W (1) of the SDRAM 5. Furthermore, for the IPs W (2) to (m) (2-2 to 2-*m*), data is sequentially written into the SDRAM 5 by a similar operation. In this case, a bus mediation circuit (not shown) controls which of the IP I/Fs (11-1 to 11-*m*) is accessed by the buffer SRAM 12. In addition, the IP I/Fs (11-1 to 11-*m*) can be provided with a buffer (not shown) between the IPs W (1) to (m) so that, in parallel with data transfer between an arbitrary IP W of the IPs W (1) to (m) (2-1 to 2-*m*), data transfer between another IP W can be performed. When transferring data of the IPs W (1) to (m) (2-1 to 2-*m*) stored in the buffer SRAM 12, the bus I/F 13 controls which data will be transferred by a mediation circuit (not shown).

Figure 7A:
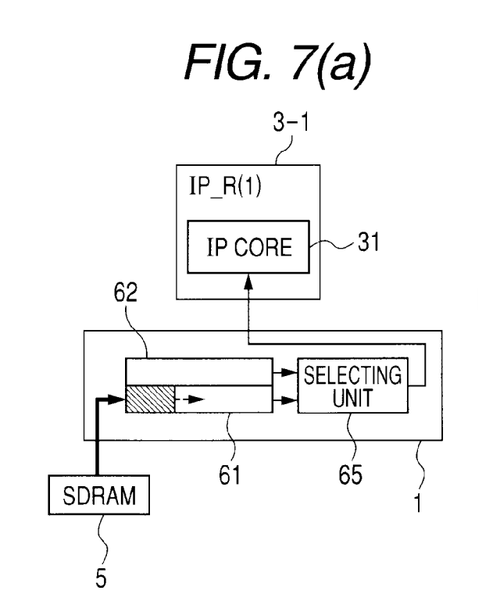
FIG. 7 is an explanatory drawing showing operation of the data server 1 when IP_R (1) 3-1 reads data from the SDRAM 5.
Figure 7B:
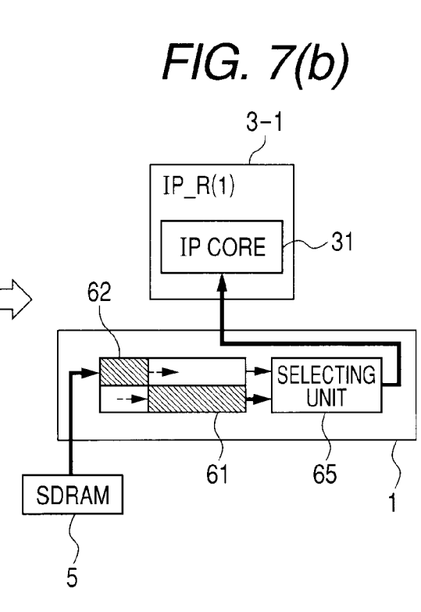
Figure 7C:
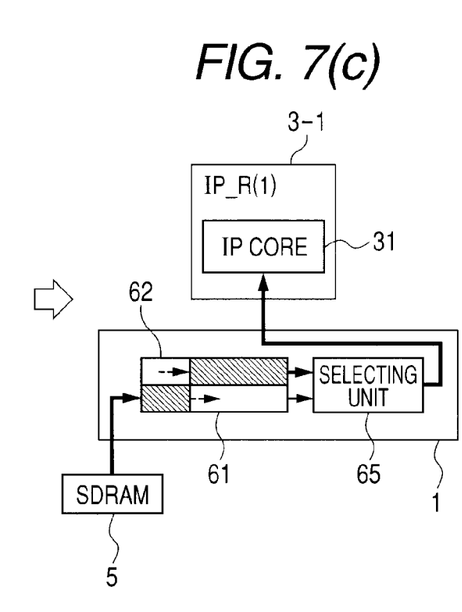

FIG. 7 is an explanatory diagram showing an operation of the data server 1 when the IP R (1) 3-1 reads data from the SDRAM 5. FIG. 7(*a*) shows the data read from the SDRAM 5 is being stored in the region A 61 for the IP R (1) (referred to as side A, hereinafter) of the buffer SRAM 15.

Upon receiving a request to start reading data from an IP core 31 in the IP R (1) 3-1, the IP I/F 14-1 first notifies it to a bus I/F 16. The bus I/F 16 acquires the starting address of the region for the IP R (1) of the SDRAM 5 with reference to the SDRAM address allocation register 18. And the bus I/F 16 then outputs the starting address to the SDRAM controller 4 via the bus 6 and reads data from the SDRAM 5. In addition, the bus I/F 16 acquires the starting address of side A 61 with reference to the buffer SRAM address allocation register 17, and writes the data read from the SDRAM 5 into the first region of side A 61 by outputting the starting address of side A 61 and the data to the buffer SRAM 15.

Subsequently, the bus I/F 16 sequentially reads data from the SDRAM 5 by burst access, and sequentially writes the read data into side A 61 while incrementing the address of the buffer SRAM 15. Furthermore, a selecting unit 65 is a circuit schematically shown for selecting which of side A 61 or a region B 62 for the IP R (1) (referred to as side B, hereinafter) the data is read from.

FIG. 7(*b*) shows the data read from the SDRAM 5 is being stored in the region B 62 of the buffer SRAM 15. When the bus I/F 16 finishes writing data on side A 61, the IP I/F 14-1 outputs, to the IP R (1) 3-1, data of the first region stored on side A 61 with reference to the buffer SRAM address allocation register 17. The IP core 31 in the IP R (1) 3-1 reads the data. The IP I/F 14-1 then sequentially outputs the data stored on side A 61 to the IP core 31 while incrementing the address of the buffer SRAM 15.

In parallel with the above operation, the bus I/F 16 reads data from the SDRAM 5 via the SDRAM controller 4. In addition, the bus I/F 16 acquires the starting address of side B 62 with reference to the buffer SRAM address allocation register 17, and writes the data read from the SDRAM 5 into the first region of side B 62, by outputting the starting address of side B 62 and the data to the buffer SRAM 15.

Subsequently, the bus I/F 16 sequentially reads data from the SDRAM 5 by burst access and sequentially writes the read data into side B 62, while incrementing the address of the buffer SRAM 15.

FIG. 7(*c*) shows the data read from the SDRAM 5 being stored on side A 61 of the buffer SRAM 15 again. The data read from the SDRAM 5 is sequentially written on side A 61 of the buffer SRAM 15 by the same operation as that explained by using FIG. 7(*a*).

In parallel with the above operation, the IP I/F 14-1 sequentially outputs the data stored on side B 62 to the IP core 31, while incrementing the address of the buffer SRAM 15.

As thus described, the regions 61 and 62 of the buffer SRAM 15 allocated to the IP R (1) 3-1 operate as a two-sided buffer in a manner like side A→side B→side A→side B→ . . . , and thus sequential burst access to the SDRAM 5 becomes possible.

By repeating the operation described above in FIGS. 7(*a*) to 7(*c*), data is sequentially read from the region for the IP R (1) of the SDRAM 5. Also for the IPs R (2) to (n) (3-2 to 3-*n*), data is sequentially read from the SDRAM 5 by a similar operation. In this case, a bus mediation circuit (not shown) controls which of the IP I/Fs (14-1 to 14-*n*) is accessed by the buffer SRAM 15. In addition, the IP I/Fs (14-1 to 14-*n*) can be provided with a buffer (not shown) between the IPs R (1) to (n) so that, in parallel with data transfer between an arbitrary IP R of the IPs R (1) to (n) (3-1 to 3-*n*), data transfer between another IP R can be performed. When transferring data of the IPs R (1) to (n) (3-1 to 3-*n*) stored in the buffer SRAM 15, the bus I/F 16 controls which data will be transferred by a mediation circuit (not shown).

Figure 8:
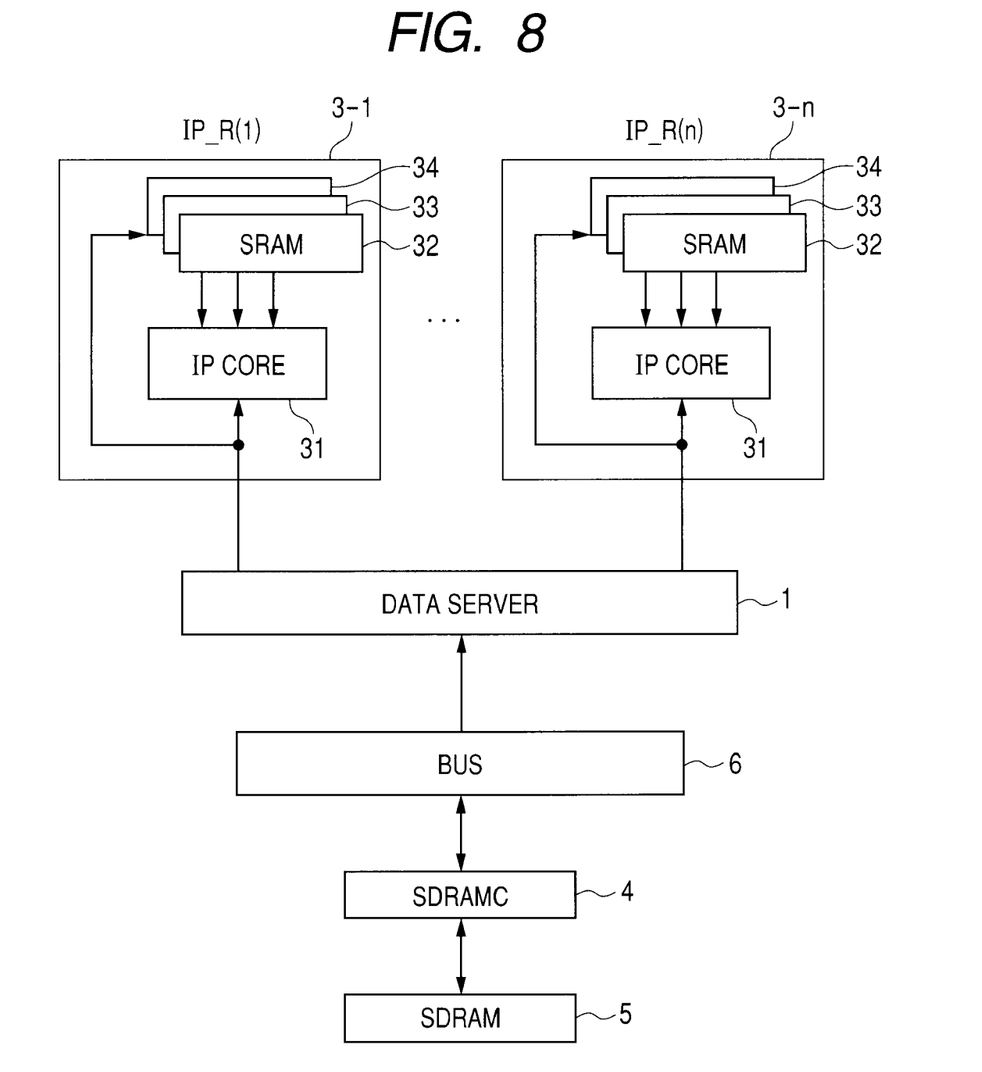
FIG. 8 is an explanatory drawing showing the configuration of IPs R (1) to (n) (3-1 to 3-$n$) more in detail.

FIG. 8 is an explanatory drawing showing the configuration of the IPs R (1) to (n) (3-1 to 3-*n*) more in detail. The IPs R (1) to (n) (3-1 to 3-*n*) further include SRAMs 32 to 34, respectively. The SRAMs 32 to 34 are memories required for processing within each IP R. If the IP is an image processing IP, the SRAMs 32 to 34 are used as line buffers.

Figure 9A:
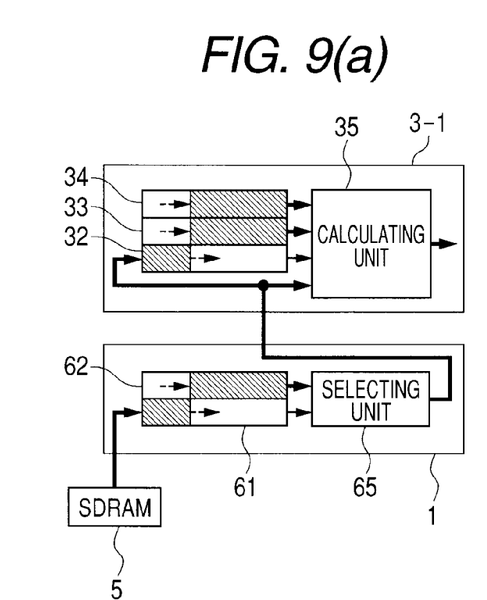
FIG. 9 is an explanatory drawing showing details of operation by the IP_R (1) 3-1 shown in FIG. 8.
Figure 9B:
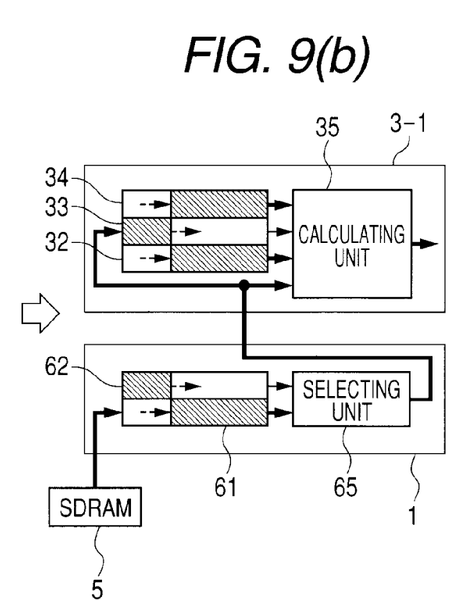
Figure 9C:
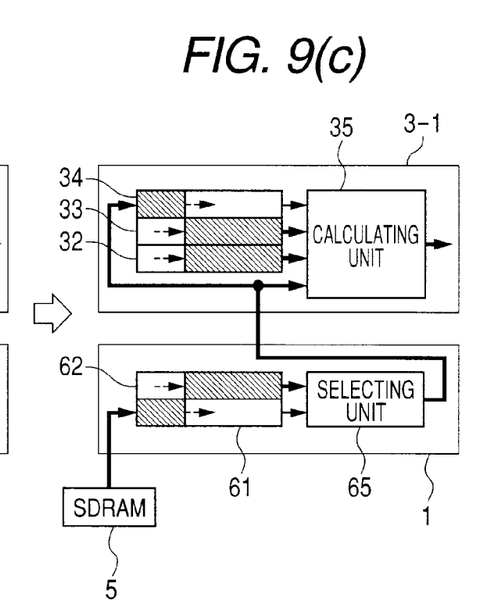

FIG. 9 is an explanatory drawing showing the details of the operation by the IP R (1) 3-1 shown in FIG. 8. FIG. 9(*a*) shows that data has already been stored in the SRAMs 33 and 34, and the data read from the SDRAM 5 is being stored in the SRAM 32. Furthermore, a calculating unit 35 indicates a processing circuit included in the IP core 31.

As shown in FIG. 9(*a*), the data read from the SDRAM 5 has previously been stored on side B 62 of the buffer SRAM 15 in the data server 1, and is sequentially transferred to the SRAM 32 in the IP R (1) 3-1 as new data. In this case, the SRAMs 33 and 34 have previously stored data therein. If, for example, the IP R (1) 3-1 is an image processing IP, previously stored image data equivalent to one line is stored in the SRAMs 33 and 34, respectively. The calculating unit 35 imports new image data transferred to the SRAM 32, and also reads the image data previously stored in the SRAMs 33 and 34 to perform an operation thereon. The operation is performed on image data equivalent to one line. Furthermore, the new data transferred to the SRAM 32 is used for subsequent operations.

FIG. 9(*b*) shows that data has already been stored in the SRAMs 32 and 34, and the data read from the SDRAM 5 is being stored in the SRAM 33 as new data. When processing of the image data equivalent to one line shown in FIG. 9(*a*) is completed, the data read from the SDRAM 5 has been stored on side A 61 of the buffer SRAM 15 in the data server 1 as shown in FIG. 9(*b*), and is sequentially transferred to the SRAM 33 in the IP R(1) 3-1. In this case, the SRAMs 32 and 34 have already stored therein image data of another line. The calculating unit 35 imports then new image data transferred to the SRAM 33, and reads the image data previously stored in the SRAMs 32 and 34 to perform an operation thereon. The operation is performed on image data equivalent to one line. Furthermore, the new data transferred to the SRAM 33 is used for subsequent operations.

FIG. 9(*c*) shows that data has already been stored in the SRAMs 32 and 33 and the data read from the SDRAM 5 is being stored in the SRAM 34 as new data. When processing of image data equivalent to one line shown in FIG. 9(*b*) is completed, as shown in FIG. 9(*c*), the data read from the SDRAM 5 has been stored on side B 62 of the buffer SRAM 15 in the data server 1, and is sequentially transferred to the SRAM 34 in the IP R(1) 3-1. In this case, the SRAMs 32 and 33 have image data of another line already stored therein. The calculating unit 35 imports image data transferred to the SRAM 34 as new data, and reads the image data previously stored in the SRAMs 32 and 33 to perform an operation thereon. The operation is performed on image data equivalent to one line. Moreover, the data transferred to the SRAM 34 is used for subsequent operations.

Further, although the two regions of the buffer SRAM 12 and 15 are described above to be used as a two-sided buffer, only the region of one side may be used in a FIFO (First In First Out) manner to perform data transfer, while controlling the region so as not to be empty of data.

In addition, although explanation has been given for the case where the SDRAM works as an memory of the data server 1, any memory capable of large capacity burst access, such as a DRAM having a high speed page mode, can be applied thereto.

As thus described, according to the data processing apparatus of the embodiment, information indicating which region of the buffer SRAMs 12 and 15 will be allocated to the IPs W(1) to (m) (2-1 to 2-*m*) and IPs R(1) to (n) (3-1 to 3-*n*) is held in the buffer SRAM address allocation register 17, and information indicating which region of the SDRAM 5 will be allocated to the IPs W(1) to (m) (2-1 to 2-*m*) and IPs R(1) to (n) (3-1 to 3-*n*) is stored in the SDRAM address allocation register 18. In addition, because the buffer SRAM address allocation register 17 and the SDRAM address allocation register 18 are referred to when accessing the SDRAM 5, it is not necessary to provide each of the IPs with a buffer SRAM, which allows integration into a smaller number of buffer SRAMs. In addition, as the number of SRAMs used can be reduced, the chip area can be reduced.

In addition, since it becomes unnecessary to provide each of the IPs with a bus I/F, integration into a small number of bus I/Fs is possible. Therefore, it becomes possible to reduce the circuit size.

In addition, since the region allocation of the buffer SRAM used by the IPs W(1) to (m) (2-1 to 2-*m*) and IPs R(1) to (n) (3-1 to 3-*n*) can be dynamically set by a program, the capacity of the buffer SRAM used by each IP can be flexibly configured.

Additionally, if different IPs are operating according to the operation mode and timing of the system, it suffices to mount only the buffer SRAM of having the capacity required for the operation mode using the largest capacity of the buffer SRAM. Therefore the capacity of the buffer SRAM can be reduced. For example, in the case where the IP W (1) and IP W (2) use the buffer SRAM only at different times (e.g., the IP W (1) uses the buffer SRAM in a first period, the IP W (2) uses the buffer SRAM in a second period, and the IP W on the other side does not use the buffer SRAM), it also becomes possible to allocate the same region of the buffer SRAM to the IP W (1) and IP W (2).

In addition, since the data server 1 performs data transfer between the SDRAM 5 via the bus 6, each IP need not output signal lines such as the address signal line, and thus the length of wiring drawn around on the chip can be shortened. Accordingly, a faster timing closure is realized, and thus the reduction of the chip area becomes possible.

If, additionally, the IPs and the SDRAM controller are provided on the chip far apart from each other, the more links are provided between the IPs and the SDRAM controller, the longer the wiring is drawn around on the chip. And thus, skew adjustment of addresses or data signal lines is required. In the above description, such a problem is prevented because each IP need not output signal lines such as the address signal line.

Further, when modifying the bus specification, only the bus I/F of the data server 1 needs to be modified, and thus the reduction of workload required for the change becomes possible.

The semiconductor integrated circuit according to the first embodiment includes the IPs R (1) to (n) (3-1 to 3-*n*) having provided therein the SRAMs 32 to 34 as shown in FIGS. 8 and 9 and performs an operation, while storing data to the SRAMs 32 to 34. The semiconductor integrated circuit including a data processing apparatus according to a second embodiment of the invention realizes the above function by providing an integrated SRAM in the data server 1, without providing the IPs R (1) to (n) (3-1 to 3-*n*) with a SRAM for storing data. The detail explanation of the parts having the same configuration and function as the semiconductor integrated circuit according to the first embodiment is not repeated.

Figure 10:
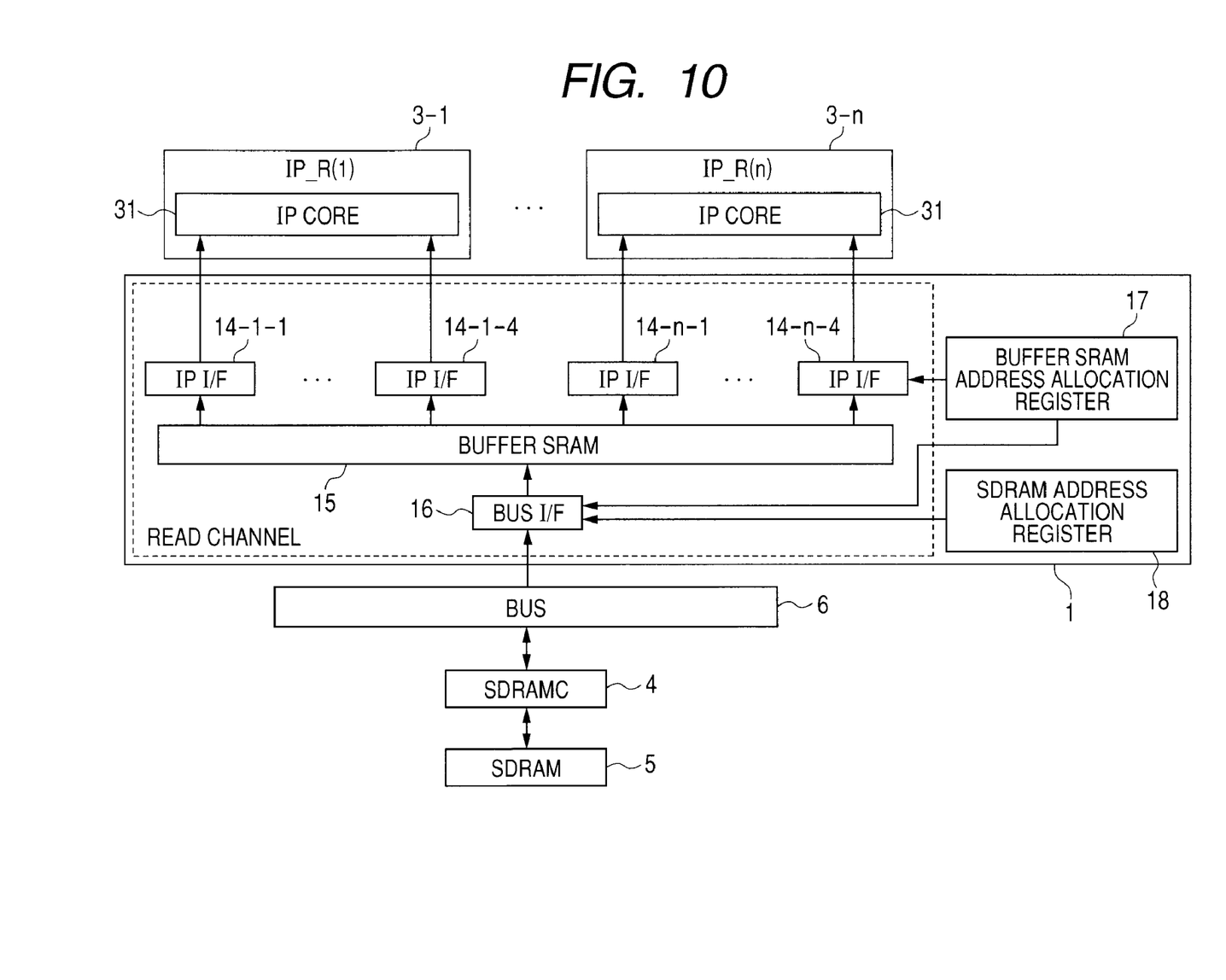
FIG. 10 shows an exemplary configuration of a semiconductor integrated circuit including a data processing apparatus according to a second embodiment of the invention.

FIG. 10 shows an exemplary configuration of a semiconductor integrated circuit including a data processing apparatus according to the second embodiment of the invention. Although the write channel part is omitted in the data server (data processing apparatus) 1, the write channel part of the data server 1 according to the first embodiment shown in FIG. 2 may be provided.

The data server 1 includes IP I/Fs 14-1-1 to 14-*n*-4 provided, respectively, corresponding to the IPs R (1) to (n) (3-1 to 3-*n*), buffer SRAM 15, the bus I/F 16, the buffer SRAM address allocation register 17 that stores information indicating which region of the buffer SRAM 15 will be allocated to the IPs R (1) to (n) (3-1 to 3-*n*), and the SDRAM address allocation register 18 that stores information indicating from which region of the SDRAM 5 data will be read by the IPs R (1) to (n) (3-1 to 3-*n*).

Four IP I/Fs 14-1-1 to 14-1-4 are provided corresponding to the IP R (1) 3-1. In addition, corresponding to the IP R (n) 3-*n*, four IP I/Fs 14-*n*-1 to 14-*n*-4 are provided. Here, although not illustrated, four IP I/Fs are respectively provided in the same way as for the IP R (2) to R (n) similarly.

Figure 11:
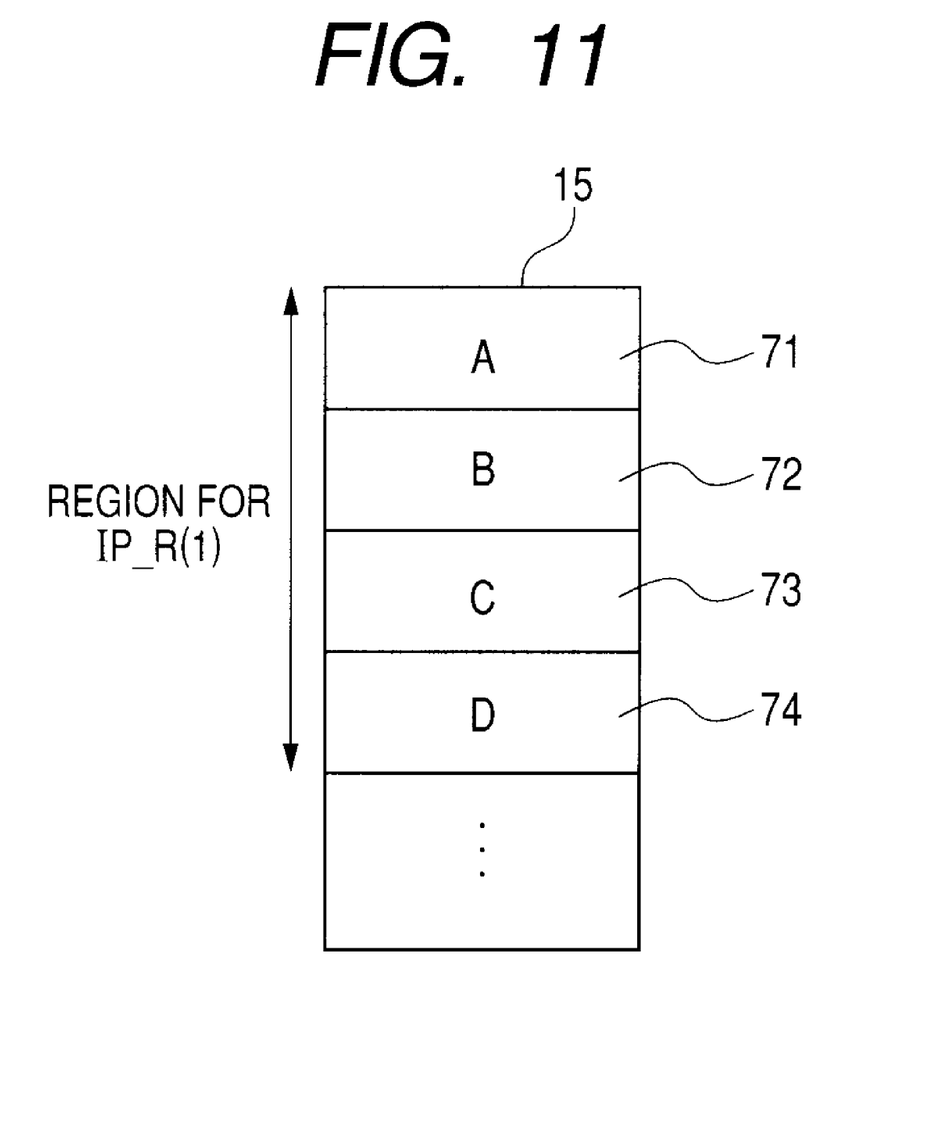
FIG. 11 is an explanatory diagram illustrating a region division in a buffer SRAM 15.

FIG. 11 is an explanatory drawing showing a region division in the buffer SRAM 15. As shown in FIG. 11, regions 71 to 74 of the buffer SRAM 15 are allocated as regions A to D for the IP R (1), respectively. The same applies to the IPs R (2) to (n).

If, for example, the IP R (1) is an image processing IP, a capacity capable of storing image data equivalent to one line, for example a 4K-byte region, is provided in the buffer SRAM 15 as a region for the IP R (1).

The buffer SRAM 15 according to the embodiment has a configuration such that data can be transferred concurrently from the four regions; for example, data can be transferred from each of the regions B to D while data is being transferred to the region A. Although not illustrated, this can also be realized by a single port SRAM by providing each region with a buffer.

The buffer SRAM address allocation register 17 holds respective starting addresses of the regions A to D for the IP R (1). Furthermore, by trying to calculate the starting addresses of the regions B to D from the starting address of the region A and respective capacities thereof, the starting addresses of the regions B to D need not be held in the buffer SRAM address allocation register 17.

Figure 12A:
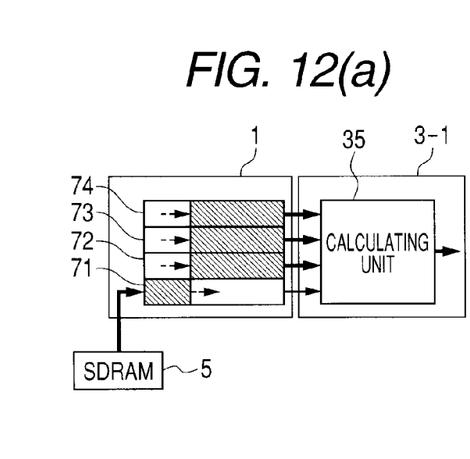
FIG. 12 is an explanatory diagram illustrating the operation of the data server 1 when the IP_R (1) 3-1 reads data from the SDRAM 5.
Figure 12B:
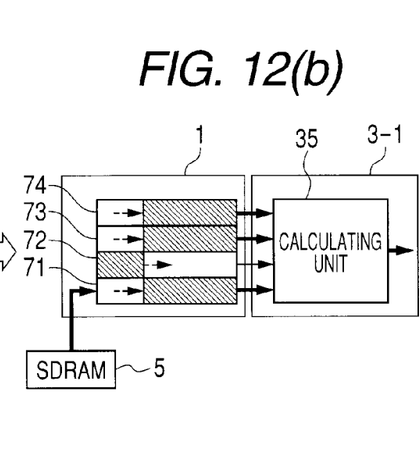
Figure 12C:
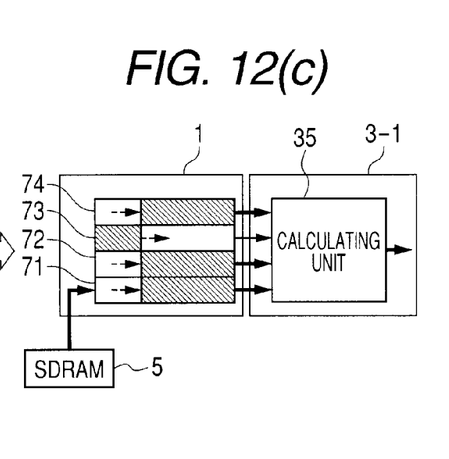

FIG. 12 is an explanatory drawing showing an operation of the data server 1 when the IP R (1) 3-1 reads data from the SDRAM 5. FIG. 12(*a*) shows the data read from the SDRAM 5 is being stored in the region A 71 for the IP R (1) (referred to as side A, hereinafter) of the buffer SRAM 15.

The bus I/F 16 reads data from the SDRAM 5 with reference to the SDRAM address allocation register 18. In addition, the bus I/F 16 also acquires the starting address of side A with reference to the buffer SRAM address allocation register 17, and writes the data read from the SDRAM 5 into the first region of side A 71 by outputting the starting address of side A 71 and the data to the buffer SRAM 15. The bus I/F 16 then sequentially reads data from the SDRAM 5 by burst access, and sequentially writes the read data into side A 71, while incrementing the address of the buffer SRAM 15.

In parallel with the above operation, the IP I/F 14-1-2 outputs, to IP R (1) 3-1, the data of the first region stored in the region B 72 (referred to as side B, hereinafter) with reference to the buffer SRAM address allocation register 17. In addition, the IP I/F 14-1-3 outputs, to IP R (1) 3-1, the data of the first region stored in the region C 73 (referred to as side C, hereinafter) with reference to the buffer SRAM address allocation register 17. Moreover, the IP I/F 14-1-4 outputs, to IP R (1) 3-1, the data of the first region stored in the region D 74 (referred to as side D, hereinafter) with reference to the buffer SRAM address allocation register 17.

The calculating unit 35 in the IP R (1) 3-1 reads data output from the IP I/Fs 14-1-2 to 14-1-4, and performs an operation thereon. The IP I/Fs 14-1 to 2-14-1-4 sequentially output, to IP R(1) 3-1, the data stored on sides B to D, 72 to 74, while incrementing the address of the buffer SRAM 15.

FIG. 12(*b*) shows the data read from the SDRAM 5 being stored on side B 72 of the buffer SRAM 15. The bus I/F 16 reads data from the SDRAM 5. In addition, the bus I/F 16 acquires the starting address of side B 72 with reference to the buffer SRAM address allocation register 17, and writes the data read from the SDRAM 5 into the first region of side B 72 by outputting the starting address of side B 72 and the data to the buffer SRAM 15. The bus I/F 16 then sequentially reads data from the SDRAM 5 by burst access, and sequentially writes the read data into side B 72, while incrementing the address of the buffer SRAM 15.

In parallel with the above operation, the IP I/F 14-1-1 outputs, to R (1) 3-1, the data of the first region stored on side A 71 with reference to the buffer SRAM address allocation register 17. In addition, the IP I/F 14-1-3 outputs, to IP R (1) 3-1, the data of the first region stored on side C 73 with reference to the buffer SRAM address allocation register 17. Moreover, the IP I/F 14-1-4 outputs, to IP R (1) 3-1, the data of the first region stored on side D 74 with reference to the buffer SRAM address allocation register 17.

The calculating unit 35 in the IP R (1) 3-1 reads the data output from the IP I/Fs 14-1-1 and 14-1-3 to 14-1-4, and performs an operation thereon. The IP I/Fs 14-1-1 and 14-1-3 to 14-1-4 then sequentially outputs, to IP R (1) 3-1, the data stored on side A 71 and sides C to D, 73 to 74, while incrementing the address of the buffer SRAM 15.

FIG. 12(*c*) shows the data read from the SDRAM 5 being stored on side C 73 of the buffer SRAM 15. The bus I/F 16 reads data from the SDRAM 5. In addition, the bus I/F 16 acquires the starting address of side C 73 with reference to the buffer SRAM address allocation register 17, and writes the data read from the SDRAM 5 into the first region of side C 73 by outputting the starting address of side C 73 and the data to the buffer SRAM 15. The bus I/F 16 then sequentially reads data from the SDRAM 5 by burst access, and sequentially writes the read data into side C 73, while incrementing the address of the buffer SRAM 15.

In parallel with the above operation, the IP I/F 14-1-1 outputs, to IP R (1) 3-1, the data of the first region stored on side A 71 with reference to the buffer SRAM address allocation register 17. In addition, the IP I/F 14-1-2 outputs, to IP R (1) 3-1, the data of the first region stored on side B 72 with reference to the buffer SRAM address allocation register 17. Moreover, the IP I/F 14-1-4 outputs, to IP R (1) 3-1, the data of the first region stored on side D 74 with reference to the buffer SRAM address allocation register 17.

The calculating unit 35 in the IP R (1) 3-1 reads data output from the IP I/Fs 14-1-1 to 14-1-2 and 14-1-4, and performs an operation thereon. The IP I/Fs 14-1-1 to 14-1-2 and 14-1-4 then sequentially outputs, to IP R (1) 3-1, data stored on sides A to B, 71 to 72 and side D 74, while incrementing the address of the buffer SRAM 15.

According to the semiconductor integrated circuit of this embodiment described above, since the data read from the SDRAM 5 by the bus I/F 16 is sequentially stored on side A to D 71-74, a plurality of data are read from the regions to which storage has been completed, and the data are output to the IP R, it is not necessary to provide a plurality of SRAMs for operations, and thus the reduction of the number of SRAMs becomes possible, in addition to the effect described in the first embodiment.

Moreover, the reduction of the total capacity of the buffer SRAM becomes possible by sharing the buffer SRAM for operations in the IP R and the buffer SRAM for access purpose in the data server 1.

The embodiments disclosed herein are for illustration purposes only, and should not be considered to be limiting. The scope of the invention is defined not by the above description but by the appended claims, and it is intended that any modification or variation of the invention in terms of equivalence is meant to be included in the claims.

What is claimed is:

1. A data processing apparatus that controls data transfer, comprising:

a plurality of image processing modules;

at least one buffer SRAM configured to temporarily store data transferred into or out of the plurality of image processing modules;

at least one SDRAM configured to store data transferred into or out of the plurality of image processing modules;

at least one first interface configured to:
acquire a first address within the at least one buffer SRAM; and
cause the transfer of first data between a particular image processing module and the at least one buffer SRAM based on the first address; and at least one second interface configured to:
acquire a second address within the SDRAM;
acquire the first address within the at least one buffer SRAM; and
cause the transfer of second data between the at least one buffer SRAM and the SDRAM based on the first and second addresses.

2. The data processing apparatus according to claim 1, wherein:

the at least one buffer SRAM comprises at least one write channel buffer SRAM;

the first data is from said particular image processing module;

the at least one first interface is configured to:
acquire said first address which corresponds to a first start address of a first memory region within the at least one buffer SRAM;
output the first address and the first data from said particular image processing module, to the at least one buffer SRAM to write the first data from said particular image processing module into the first memory region; and the at least one second interface is configured to:
acquire said second address which corresponds to a second start address of a second memory region in the at least one SDRAM; and
acquire said first address which corresponds to the first start address of the first memory region in the at least one buffer SRAM into which the first data has been written; and
cause the first data in the first memory region to be written into the second memory region of the least one SDRAM, as the second data, based on the first and second addresses.

3. The data processing apparatus according to claim 2, wherein the second data is written into the second memory region of the least one SDRAM by sequentially outputting, to a SDRAM controller of the at least one SDRAM, the first data stored in the first memory region.

4. The data processing apparatus according to claim 2, wherein the least one first interface is further configured to:
write additional data from said particular image processing module into another memory region of the at least one buffer SRAM, while the first data stored in the first memory region is being written into the at least one SDRAM.

5. The data processing apparatus according to claim 1, wherein:

the at least one buffer SRAM comprises at least one read channel buffer SRAM;

the second data is stored in the at least one SDRAM;

the at least one second interface is configured to:
acquire said second address which corresponds to a second start address of a second memory region in the at least one SDRAM; and acquire said first address which corresponds to a first start address of a first memory region in the at least one buffer SRAM; and output said first address and the second data from the second memory region, to the at least one buffer SRAM to write, as the first data, the second data into the first memory region; and the at least one first interface is configured to:

acquire said first address which corresponds to the first start address of the first memory region in the at least one buffer SRAM; and based on said first address, cause the at least one buffer SRAM to output the first data from the first memory region, to said particular image processing module.

6. The data processing apparatus according to claim 5, wherein the at least one second interface is configured to:

sequentially read data from the at least one SDRAM, and sequentially write the read data into the first memory region while incrementing an address of the at least one buffer SRAM.

7. The data processing apparatus according to claim 5, wherein the least one second interface is further configured to:

write additional data from said at least one SDRAM into the first memory region of the at least one buffer SRAM, while the first data is being output to said particular image processing module.

8. The data processing apparatus according to claim 1, further comprising:

a first register containing a first table comprising second addresses; and a second register containing a second table comprising first addresses.

9. The data processing apparatus according to claim 1, wherein:

the at least one buffer SRAM comprises:

at least one read channel buffer SRAM;

at least one write channel buffer SRAM; and the at least one SDRAM comprises a single SDRAM configured to store data transferred into or out of the plurality of image processing modules.

10. The data processing apparatus according to claim 1, further comprising:

a first register containing a first table comprising second addresses; and a second register containing a second table comprising first addresses.

11. The data processing apparatus according to claim 1, wherein:

a plurality of the first interfaces are provided, each first interface corresponding to one image processing module;

the at least one buffer SRAM is shared by said plurality of image processing modules; and the at least one buffer SRAM includes a plurality of first memory regions, each of which is associated with one image processing module.

12. The data processing apparatus according to claim 1, wherein:

a plurality of the first interfaces are provided;

each image processing module is associated with a plurality of first interfaces;

while one first interface associated with a given image processing module is causing the transfer of data read from a first region of the at least one buffer SRAM, another first interface associated with the same image processing module is causing the transfer of data read from a second region of the at least one buffer SRAM.

13. The data processing apparatus according to claim 1, wherein the at least one first interface reads data from the at least one buffer SRAM by burst access.

14. The data processing apparatus according to claim 1, wherein:

each image processing module is devoid of local memory having a size sufficient to accommodate a line of image data;

each image processing module has a number K corresponding first interfaces; and each of said number K corresponding first interfaces is connected to the at least one buffer SRAM.

15. The data processing apparatus according to claim 14, wherein:

each image processing module maps onto each of a number K first regions within the at least one buffer SRAM via a corresponding one of said K corresponding first interfaces; and the at least one buffer SRAM is configured to transfer data concurrently to or from each of the K first regions.

16. The data processing apparatus according to claim 15, wherein:

each image processing module is configured to:

receive new first data from memory via a first of said K first regions;

receive previously stored first data from one or more of the remaining K-1 first regions; and perform operations using both the new data and the previously stored first data.

17. The data processing apparatus according to claim 1, wherein:

each image processing module comprises a plurality of local memory portions; and each image processing module is configured to:

receive into a first of the local memory portions, new first data from the at least one SDRAM via the at least one buffer SRAM;

combine the new first data with already stored data in one or more of the remaining local memory portions; and perform operations using both the new first data and the already stored data.

18. The data processing apparatus according to claim 1, wherein:

the image processing modules are devoid of address signal lines to the at least one buffer SRAM.

19. The data processing apparatus according to claim 1, wherein:

each image processing module has a single dedicated first interface connected to the at least one buffer SRAM.

* * * * *